United States Patent [19]
Huang

[11] 3,958,157
[45] May 18, 1976

[54] OIL LEVEL DETECTION CIRCUIT

[75] Inventor: Kwang-ta Huang, Oxnard, Calif.

[73] Assignee: The United States of America as represented by the Secretary of the Navy, Washington, D.C.

[22] Filed: Feb. 12, 1975

[21] Appl. No.: 549,396

[52] U.S. Cl. .................................. 317/123; 307/18; 317/DIG. 3; 340/244 C
[51] Int. Cl.² .......................................... G05D 9/12
[58] Field of Search .................. 317/DIG. 3, DIG. 5, 317/123; 307/118; 340/244 C

[56] References Cited
UNITED STATES PATENTS

| | | | |
|---|---|---|---|
| 2,202,197 | 5/1940 | Ewertz | 317/DIG. 3 |
| 3,335,334 | 8/1967 | Albisser | 317/DIG. 3 |
| 3,603,846 | 9/1971 | Toth | 317/DIG. 5 |
| 3,781,839 | 12/1973 | Bodge | 317/DIG. 3 |

Primary Examiner—R. N. Envall, Jr.
Assistant Examiner—Harry E. Moose, Jr.
Attorney, Agent, or Firm—Richard S. Sciascia; Joseph M. St.Amand; Darrell E. Hollis

[57] ABSTRACT

A circuit for detecting the level of oil in an oil-collecting chamber containing oil floating on water. A pair of electrodes are disposed in the oil-collecting chamber for detecting the presence of oil therein. A sensing circuit, connected between the electrodes and an amplifier, contains a sensing current when water or air surrounds the electrodes. The amplified sensing current switches a transistor on transmitting a d-c voltage to an open type solenoid valve located in an outlet tube thereby closing the valve.

7 Claims, 1 Drawing Figure

OIL LEVEL DETECTION CIRCUIT

BACKGROUND OF THE INVENTION

1. Field of the Invention

This invention relates generally to oil-level detection circuits and more particularly to those employing means for actuating a valve in an outlet tube.

2. Description of the Prior Art

While prior art oil-level detection devices exist, such devices are extremely complicated in design requiring numerous expensive components.

SUMMARY OF THE INVENTION

The present invention overcomes many of these problems by providing a pair of electrodes for sensing oil in an oil-collecting chamber containing oil floating on water. A sensing circuit connected between the electrodes and an amplifier contains a sensing current when water or air surrounds the electrodes. The amplified sensing current switches a transistor "on" which connects a d-c voltage to an open type solenoid valve located in an outlet tube thereby closing the valve.

Accordingly, an object of the present invention is to reduce costs.

Another object of the present invention is to detect oil.

Another object of the present invention is to detect air or water.

Another object of the present invention is to close a valve when air or water is detected.

Another object of the present invention is to reduce electrolysis.

Another object of the present invention is to increase efficiency and reduce maintenance.

Other objects and a more complete appreciation of the present invention and its many attendant advantages will develop as the same become better understood by reference to the following detailed description when considered in connection with the accompanying drawing.

DESCRIPTION OF THE PREFERRED EMBODIMENT

Figure 1:
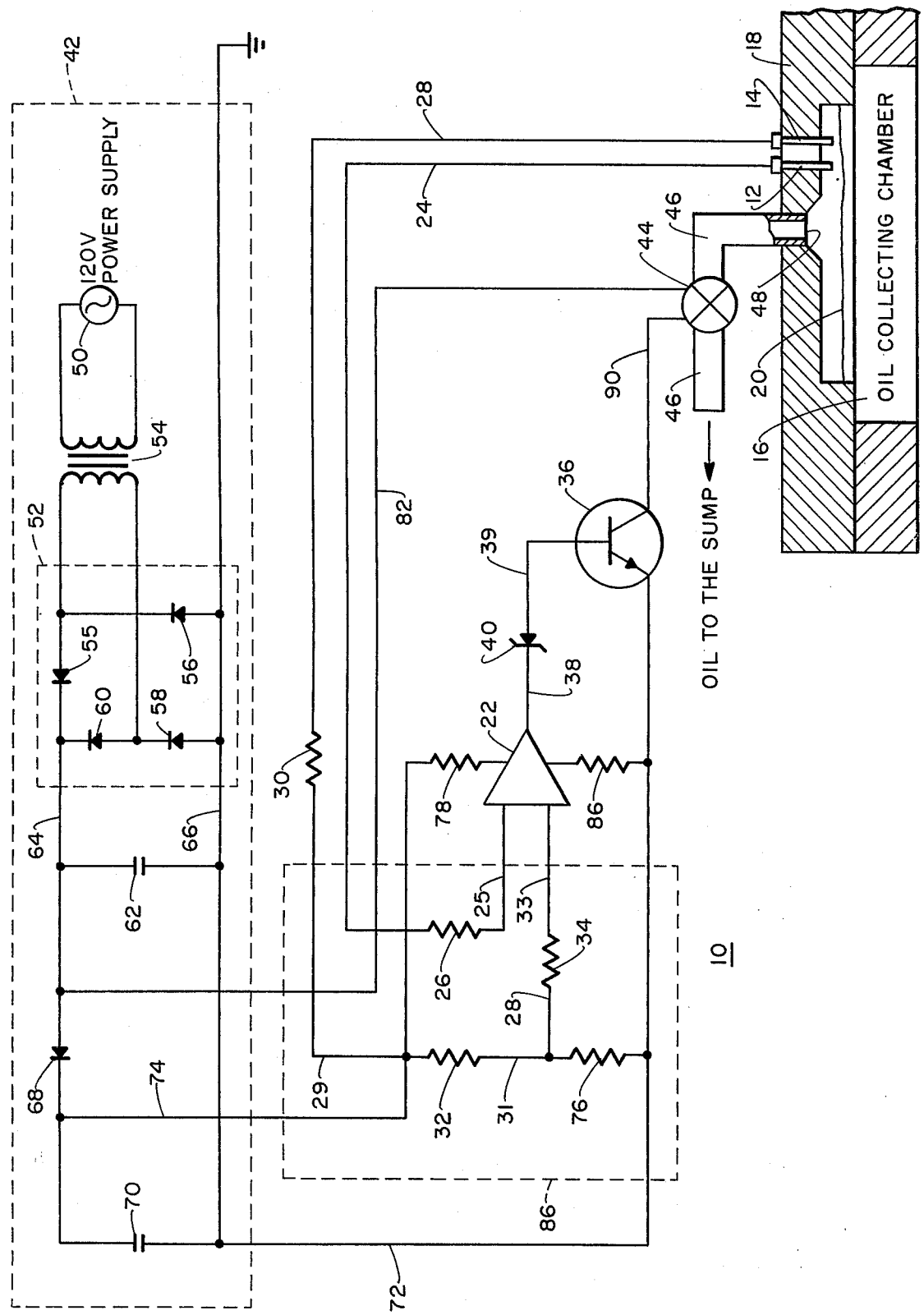
FIG. 1 is a schematic diagram of a specific embodiment of the present invention.

The FIGURE illustrates an oil detection circuit 10. A pair of metallic electrodes 12 and 14 extend into an oil collecting chamber 16. Of course, electrodes 12 and 14 are electrically insulated from each other by housing 18. Electrodes 12 and 14 sense the oil-water interface 20 in chamber 16.

Electrodes 12 is connected to high gain operational amplifier 22 via lines 24 and 25 through resistor 26. Electrode 14 is connected to high gain operational amplifier 22 via lines 28, 29, 31, and 33 through resistors 30, 32 and 34. Resistor 30 limits the circulating current in sensing circuit 86 to a few micro-amperes to minimize electrolysis in oil-collecting chamber 16.

The amplified signal from operational amplifier 22 inputs transistor 36 via lines 38 and 39 after passing through zener diode 40. Transistor 36 switches the power from direct current power supply 42 on lines 72, 82 and 90, "on" or "off" to solenoid valve 44. Solenoid valve 44 is located in outlet tube 46. Tube 46 communicates with chamber 16 at orifice 48. Solenoid valve 44 is an open type valve operable from a direct current power supply such as power supply 42.

Direct current power supply 42 comprises a 120 volt a-c power supply 50 connected to full-wave rectifying circuit 52 through transformer 54. Full wave rectifying circuit 52 is comprised of diodes 54, 56, 58 and 60. Capacitor 62 is connected across the output of full-wave rectifying circuit 52 between lines 64 and 66. Capacitor 62 smoothes and regulates the rectified signal. Diode 68 and capacitor 70 are connected in series. Diode 68 isolates capacitor 70 and prevents negative excursions of the rectified signal from charging capacitor 70. Capacitor 70 regulates the d-c voltage level present on line 74.

A d-c biasing signal is transmitted from d-c power supply 42 via line 74 to a resistor biasing network associated with operational amplifier 22. The resistor biasing network comprises resistor 78 and 80.

D-C power supply 42 is connected to one input of solenoid switch 44 via line 82.

The circuit 10 operates in the following manner. When electrodes 12 and 14 are immersed in oil or air no current will flow through sensing circuit 86 and transistor 36 will remain "off" thereby maintaining solenoid valve 36 open. Sensing circuit 86 comprises resistors 32, 26, 76 and 34. However, whenever electrodes 12 and 14 make electrical contact with each other through water, a current is induced in sensing circuit 86 whereby transistor 36 is turned "on." When "on," transistor 36 transmits d-c power through solenoid valve 44 via line 72, 90 and 82 thereby closing solenoid valve 44. When transistor 36 is "off," solenoid valve 44 remains open.

It is noted that the distance between electrodes 12 and 14 determines the sensitivity of sensing circuit 86. As the distance between electrodes 12 and 14 decreases, the current in sensing circuit 86 increases. Thus the shorter the distance between electrodes 12 and 14, the more sensitivity circuit 10 attains. In addition, the distance electrodes 12 and 14 extend into chamber 16 from housing 18 is variable, thereby creating a variable oil level detection capability.

Obviously, numerous modifications and variations of the present invention are possible in light of the above teachings. It is therefore to be understood that within the scope of the appended claims, the invention may be practices otherwise than as specifically described herein.

I claim:

1. An oil level detection circuit for detecting the level of oil floating on water in an oil-collecting chamber and for controlling a solenoid valve located in a tube utilized for removing the oil from said chamber comprising:

a. a first and second electrode both extending downwardly into said oil collecting chamber a specific first distance and being spaced apart a specific second distance, both said specific first distance and said specific second distance being variable, said specific second distance determining the sensitivity of said sensing circuit;

b. a d-c power supply having a first and second output; said second output being connected to said solenoid valve;

c. a sensing circuit having a variable sensitivity capability connected to said oil detecting means, said sensing circuit having a sensing current flowing therein whenever said detecting means detects water or air in said oil-collecting chamber;
d. an amplifier circuit connected to said sensing circuit, said amplifier amplifying and sensing current;
e. switching means connected between said first output of said d-c power supply and said solenoid valve, said switching means having a control input connected to said amplifier circuit, said switching means switching d-c power from said d-c power supply to said solenoid valve when water or air surrounds said oil detecting means thereby closing said solenoid valve.

2. The apparatus of claim 1 further comprising means located between said oil-detecting means and said sensing circuit for limiting the circulating current in said sensing circuit to a few microamperes thereby minimizing electrolysis in said oil-collecting chamber.

3. The apparatus of claim 2 wherein said limiting means comprises a resistor.

4. The apparatus of claim 1 wherein said sensing circuit comprises a plurality of resistors.

5. The apparatus of claim 1 wherein said amplifier circuit includes a high gain operational amplifier.

6. The apparatus of claim 1 wherein said switching means includes a switching transistor.

7. The apparatus of claim 1 further comprising a zener diode located between said amplifier circuit and said conrol input to said switching means.

* * * * *